United States Patent
Wang et al.

(10) Patent No.: US 10,601,023 B2
(45) Date of Patent: Mar. 24, 2020

(54) SECONDARY BATTERY AND ASSEMBLY THEREFOR

(71) Applicant: CONTEMPORARY AMPEREX TECHNOLOGY CO., LIMITED, Ningde (CN)

(72) Inventors: Jiajun Wang, Ningde (CN); Youlei Lai, Ningde (CN); Yulian Zheng, Ningde (CN); Peng Wang, Ningde (CN); Tianjun Xia, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 194 days.

(21) Appl. No.: 15/816,991

(22) Filed: Nov. 17, 2017

(65) Prior Publication Data
US 2018/0159111 A1 Jun. 7, 2018

(30) Foreign Application Priority Data
Dec. 2, 2016 (CN) ..................... 2016 2 1318454 U

(51) Int. Cl.
*H01M 2/34* (2006.01)
*H01M 2/04* (2006.01)
*H01M 2/06* (2006.01)

(52) U.S. Cl.
CPC ......... *H01M 2/348* (2013.01); *H01M 2/0482* (2013.01); *H01M 2/06* (2013.01); *H01M 2/04* (2013.01); *H01M 2200/103* (2013.01)

(58) Field of Classification Search
None
See application file for complete search history.

(56) References Cited

U.S. PATENT DOCUMENTS

| 2013/0101875 A1 | 4/2013 | Kim et al. |
| 2013/0143080 A1* | 6/2013 | Byun ............... H01M 2/06 429/61 |

(Continued)

FOREIGN PATENT DOCUMENTS

| CN | 102035186 A | 4/2011 |
| CN | 102208594 B | 4/2015 |

(Continued)

OTHER PUBLICATIONS

Contemporary Amperex Technology Co. Limited, Extended European Search Report, EP17204040.4, dated Feb. 9, 2018, 9 pgs.

*Primary Examiner* — Daniel S Gatewood
(74) *Attorney, Agent, or Firm* — Morgan, Lewis & Bockius LLP

(57) ABSTRACT

The present disclosure provides a secondary battery and an assembly therefor. The secondary battery comprises: a cap plate provided with a first electrode terminal and a second electrode terminal; an electrode assembly comprising a first electrode tab and a second electrode tab; a first connecting piece connected between the first electrode tab and the first electrode terminal. The first connecting piece includes a first electrode terminal connecting portion, a first electrode tab connecting portion and a first fusing portion. The secondary battery further comprises an insulating holding block, two ends of which are connected with the first electrode terminal connecting portion and the first electrode tab connecting portion respectively, and the insulating holding block is configured to maintain the first electrode terminal connecting portion and the first electrode tab connecting portion in position relative to each other when the first fusing portion is fused.

20 Claims, 7 Drawing Sheets

(56) References Cited

U.S. PATENT DOCUMENTS

2014/0234673 A1\* 8/2014 Byun .................... H01M 2/348
                                                                                                    429/61
2016/0049635 A1     2/2016 Park et al.

FOREIGN PATENT DOCUMENTS

| CN | 205376627 U | 7/2016 | |
|---|---|---|---|
| CN | 205429058 U | 8/2016 | |
| EP | 2416406 A1 \* | 2/2012 | .......... H01M 2/0275 |
| JP | 2013161686 A | 8/2013 | |

\* cited by examiner

SECONDARY BATTERY AND ASSEMBLY THEREFOR

CROSS-REFERENCE TO RELATED APPLICATIONS

The present application claims priority to Chinese patent application No. 201621318454.4, filed on Dec. 2, 2016, which is incorporated herein by reference in its entirety.

FIELD OF THE PRESENT DISCLOSURE

The present disclosure relates to the field of battery, and particularly relates to a secondary battery and an assembly therefor.

BACKGROUND OF THE PRESENT DISCLOSURE

Referring to FIGS. 1-3, a first connecting piece 3 is generally used in the prior art to fix a first electrode tab 21 of an electrode assembly 2 to a first electrode terminal 11 of a cap plate 1, and the first connecting piece 3 is provided with a first fusing portion 33. When a high current flows through the first connecting piece 3, the first fusing portion 33 can be fused in time so as to quickly cut off the electrical connection between the first electrode tab 21 and the first electrode terminal 11, and prevent a thermal runaway of the secondary battery. However, the first electrode terminal connecting portion 31 and the first electrode tab connecting portion 32 of the first connecting piece 3 will be separated from each other and become two independent parts after the first fusing portion 33 is fused, and when the electrode assembly 2 is subjected to external impact and vibrates, the electrode assembly 2 will bring the first electrode tab connecting portion 32 to move up and down via the first electrode tab 21, the first electrode tab connecting portion 32 will easily contact the first electrode terminal connecting portion 31 to establish the electrical connection between the first electrode tab connecting portion 32 and the first electrode terminal connecting portion 31 again, thereby resulting in thermal runaway and causing explosion, so the first fusing portion 33 cannot function for safety protection.

SUMMARY OF THE PRESENT DISCLOSURE

In view of the problem existing in the background, an object of the present disclosure is to provide a secondary battery and an assembly therefor, which can prevent thermal runaway of the secondary battery and improve safety performance of the secondary battery.

In order to achieve the above object, in a first aspect, the present disclosure provides a secondary battery which comprises: a cap plate provided with a first electrode terminal and a second electrode terminal; an electrode assembly comprising a first electrode tab and a second electrode tab; a first connecting piece connected between the first electrode tab and the first electrode terminal. The second electrode tab is electrically connected with the second electrode terminal. The first connecting piece includes a first electrode terminal connecting portion, a first electrode tab connecting portion and a first fusing portion, the first electrode terminal connecting portion is fixed to the first electrode terminal, the first electrode tab connecting portion is fixed to the first electrode tab, and the first fusing portion is connected between the first electrode terminal connecting portion and the first electrode tab connecting portion. The secondary battery further comprises an insulating holding block, two ends of the insulating holding block are connected with the first electrode terminal connecting portion and the first electrode tab connecting portion respectively, and the insulating holding block is configured to maintain the first electrode terminal connecting portion and the first electrode tab connecting portion in position relative to each other when the first fusing portion is fused. In a second aspect, the present disclosure provides an assembly for secondary battery which comprises a first connecting piece and an insulating holding block. The first connecting piece includes a first electrode terminal connecting portion, a first electrode tab connecting portion and a first fusing portion, the first fusing portion is connected between the first electrode terminal connecting portion and the first electrode tab connecting portion. Two ends of the insulating holding block are connected with the first electrode terminal connecting portion and the first electrode tab connecting portion respectively, and the insulating holding block is configured to maintain the first electrode terminal connecting portion and the first electrode tab connecting portion in position relative to each other when the first fusing portion is fused.

The present disclosure has the following beneficial effects: in the secondary battery and the assembly therefor according to the present disclosure, the first fusing portion is connected between the first electrode terminal connecting portion and the first electrode tab connecting portion, therefore when a high current caused by overcharging or short circuit flows through the first connecting piece, the first fusing portion will be fused in time so as to quickly cut off the electrical connection between the first electrode tab and the first electrode terminal, and prevent thermal runaway of the secondary battery; and when the first fusing portion is fused, the insulating holding block maintains the first electrode terminal connecting portion and the first electrode tab connecting portion in position relative to each other, and prevent the first connecting piece from becoming two independent parts at the fused position of the first fusing portion, and avoid contact between the first electrode tab connecting portion and the first electrode terminal connecting portion when the secondary battery is subjected to external impact, and prevent the electrical connection between the first electrode tab connecting portion and the first electrode terminal connecting portion from being established again, improve the safety performance of the secondary battery.

Figure 1:
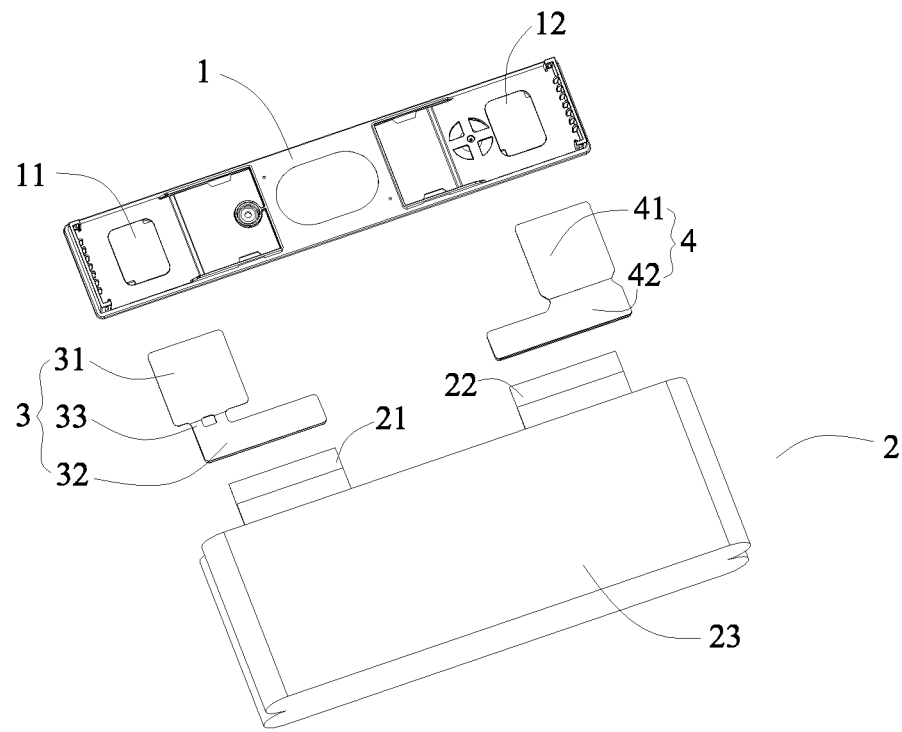
FIG. 1 is a schematic view of a secondary battery in the prior art.
Figure 2:
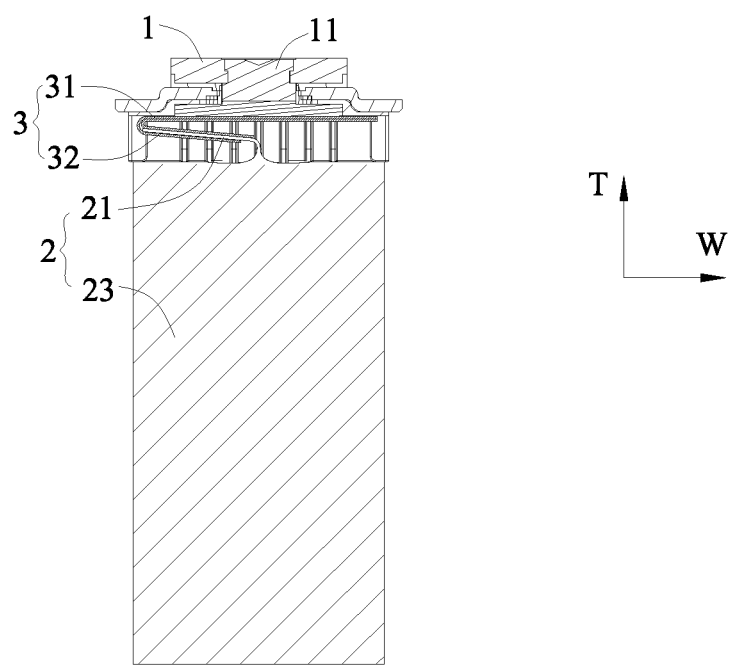
FIG. 2 is a cross sectional view of the secondary battery in the prior art.
Figure 3:
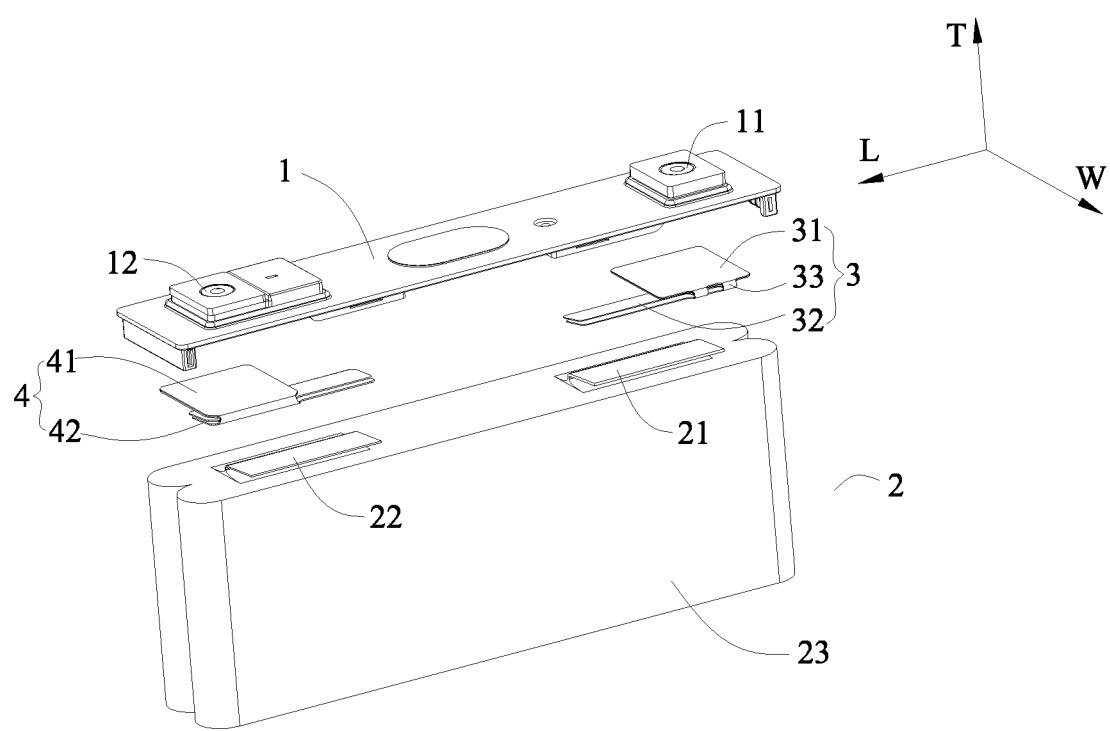
FIG. 3 is an exploded view of the secondary battery in the prior art.

Reference numerals in figures are represented as follows:
1 cap plate
  11 first electrode terminal
  12 second electrode terminal
2 electrode assembly
  21 first electrode tab
    211 connecting section
    212 bending section
  22 second electrode tab
  23 main body
3 first connecting piece
  31 first electrode terminal connecting portion
  32 first electrode tab connecting portion
    321 first electrode tab connecting sub-portion
    322 first electrode tab jointing sub-portion
  33 first fusing portion
    331 opening
    332 fusing sub-portion
4 second connecting piece
  41 second electrode terminal connecting portion
  42 second electrode tab connecting portion
    421 second electrode tab connecting sub-portion
    422 second electrode tab jointing sub-portion
5 insulating holding block
  51 first holding portion
    511 fixing post
  52 second holding portion
6 insulating bar
7 insulating piece
8 welding protecting piece
H fixing hole
G notch
S insulating adhesive
L length direction
W width direction
T thickness direction

DETAILED DESCRIPTION

Hereinafter a secondary battery according to the present disclosure will be described in detail in combination with the figures.

Referring to FIGS. 4-14, a secondary battery according to the present disclosure comprises: a cap plate 1 provided with a first electrode terminal 11 and a second electrode terminal 12 which are opposite in electrical polarity; an electrode assembly 2 comprising a first electrode tab 21 and a second electrode tab 22 which are opposite in electrical polarity; a first connecting piece 3 connected in series between the first electrode tab 21 and the first electrode terminal 11. The second electrode tab 22 is electrically connected with the second electrode terminal 12. The first connecting piece 3 includes a first electrode terminal connecting portion 31, a first electrode tab connecting portion 32 and a first fusing portion 33, the first electrode terminal connecting portion 31 is fixed to and electrically connected with the first electrode terminal 11, the first electrode tab connecting portion 32 is fixed to and electrically connected with the first electrode tab 21, and the first fusing portion 33 is connected in series between the first electrode terminal connecting portion 31 and the first electrode tab connecting portion 32. The secondary battery further comprises an insulating holding block 5, two ends of the insulating holding block 5 are securely connected with the first electrode terminal connecting portion 31 and the first electrode tab connecting portion 32 respectively, and the insulating holding block 5 is configured to capably maintain the first electrode terminal connecting portion 31 and the first electrode tab connecting portion 32 in position relative to each other when the first fusing portion 33 is fused.

In the secondary battery according to the present disclosure, the first fusing portion 33 is connected in series between the first electrode terminal connecting portion 31 and the first electrode tab connecting portion 32, therefore when a high current caused by overcharging or short circuit flows through the first connecting piece 3, the first fusing portion 33 will be fused in time so as to quickly cut off the electrical connection between the first electrode tab 21 and the first electrode terminal 11, and prevent thermal runaway of the secondary battery; and when the first fusing portion 33 is fused, the insulating holding block 5 capably maintain the first electrode terminal connecting portion 31 and the first electrode tab connecting portion 32 in position relative to each other, and prevent the first connecting piece 3 from becoming two independent parts (that is the first electrode terminal connecting portion 31 and the first electrode tab connecting portion 32 is separated from each other to become two independent parts) at the fused position of the first fusing portion 33, and avoid contact between the first electrode tab connecting portion 32 and the first electrode terminal connecting portion 31 when the secondary battery is subjected to external impact (when the secondary battery is subjected to external impact, the electrode assembly 2 will vibrate, so the electrode assembly 2 will bring the first electrode tab connecting portion 32 to move via the first electrode tab 21, which may lead to the contact between the first electrode tab connecting portion 32 and the first electrode terminal connecting portion 31), and prevent the electrical connection between the first electrode tab connecting portion 32 and the first electrode terminal connecting portion 31 from being established again, improve the safety performance of the secondary battery.

In the secondary battery according to the present disclosure, referring to FIGS. 9-14, each of the first electrode terminal connecting portion 31 and the first electrode tab connecting portion 32 is provided with a through fixing hole H; correspondingly, the insulating holding block 5 comprises a first holding portion 51 and a second holding portion 52. The first holding portion 51 is provided on one side of the first connecting piece 3 along a thickness direction T and includes fixing posts 511 which respectively correspond to the fixing hole H of the first electrode terminal connecting portion 31 and the fixing hole H of the first electrode tab connecting portion 32, and each fixing post 511 passes through the fixing hole H and extends to the other side of the first connecting piece 3 along the thickness direction T. The second holding portion 52 is provided on the other side of the first connecting piece 3 along the thickness direction T and is securely connected with the fixing posts 511 of the first holding portion 51 which respectively pass through the fixing hole H of the first electrode terminal connecting portion 31 and the fixing hole H of the first electrode tab connecting portion 32. The first holding portion 51 and the second holding portion 52 may be made of plastic.

In the secondary battery according to the present disclosure, the insulating holding block 5 can be securely connected with the first electrode terminal connecting portion 31 and the first electrode tab connecting portion 32 via cooperation between the first holding portion 51 and the second holding portion 52. The second holding portion 52 may be securely connected with the fixing posts 511 of the first holding portion 51 by means of hot melting, interference fit, riveting, latching, adhering, inserting and the like, but it is not limited to these above-mentioned connecting manners, and any other connecting manners can be used as long as the fixing posts 511 of the first holding portion 51 can be securely connected with the second holding portion 52.

In the secondary battery according to the present disclosure, each of the first electrode terminal connecting portion 31 and the first electrode tab connecting portion 32 is provided with a through fixing hole H; the insulating holding block 5 comprises a first holding portion 51, the first holding portion 51 is provided on one side of the first connecting piece 3 along the thickness direction T and includes fixing posts 511 which respectively correspond to the fixing hole H of the first electrode terminal connecting portion 31 and the fixing hole H of the first electrode tab connecting portion 32, and each fixing post 511 passes through the fixing hole H and is securely connected with the first connecting piece 3. The first holding portion 51 may be made of plastic.

In the secondary battery according to the present disclosure, the fixing posts 511 may be securely connected with the first electrode terminal connecting portion 31 and the first electrode tab connecting portion 32 directly by means of hot melting, interference fit, riveting, adhering and the like, but it is not limited to these above-mentioned connecting modes.

In the secondary battery according to the present disclosure, the fixing hole H is an oblong hole. A shape of the fixing post 511 corresponds to the fixing hole H.

Figure 9:
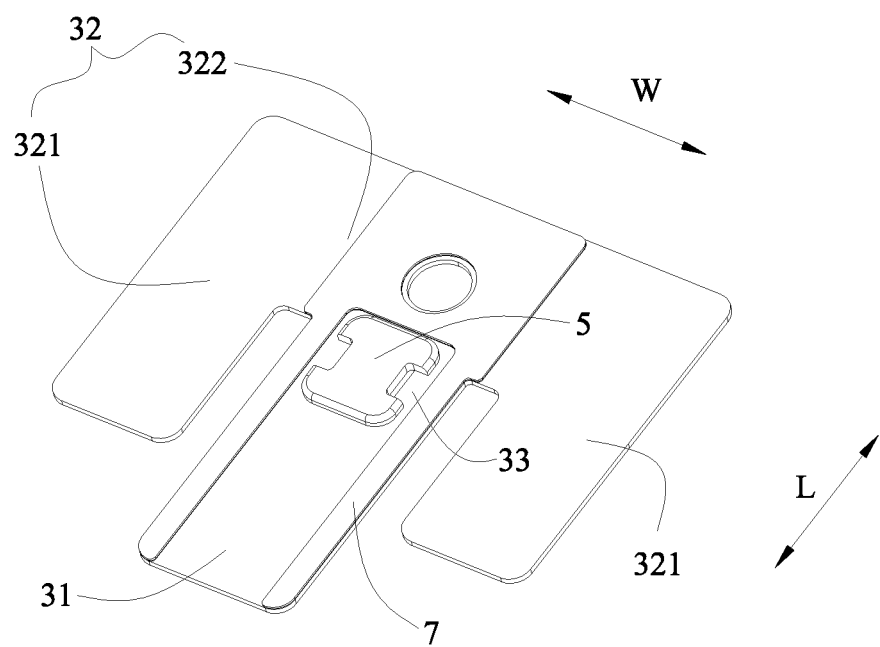
FIG. 9 is a schematic view of a first connecting piece, an insulating holding block and an insulating piece of the secondary battery according to the present disclosure.
Figure 10:
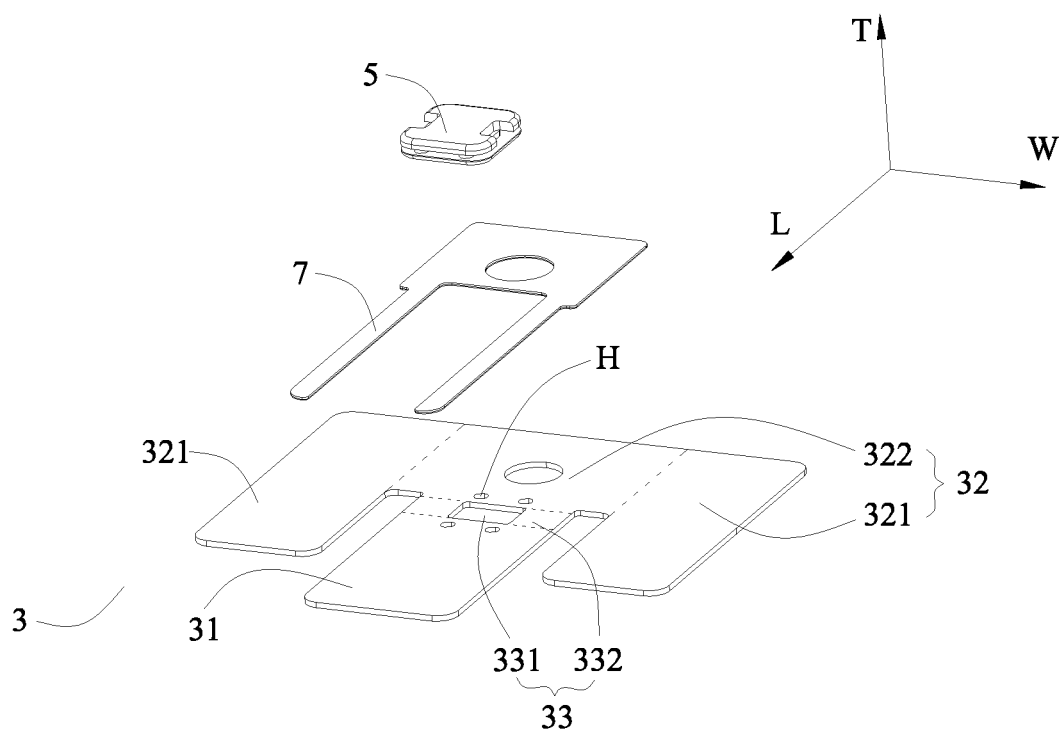
FIG. 10 is an exploded view of FIG. 9.
Figure 11:
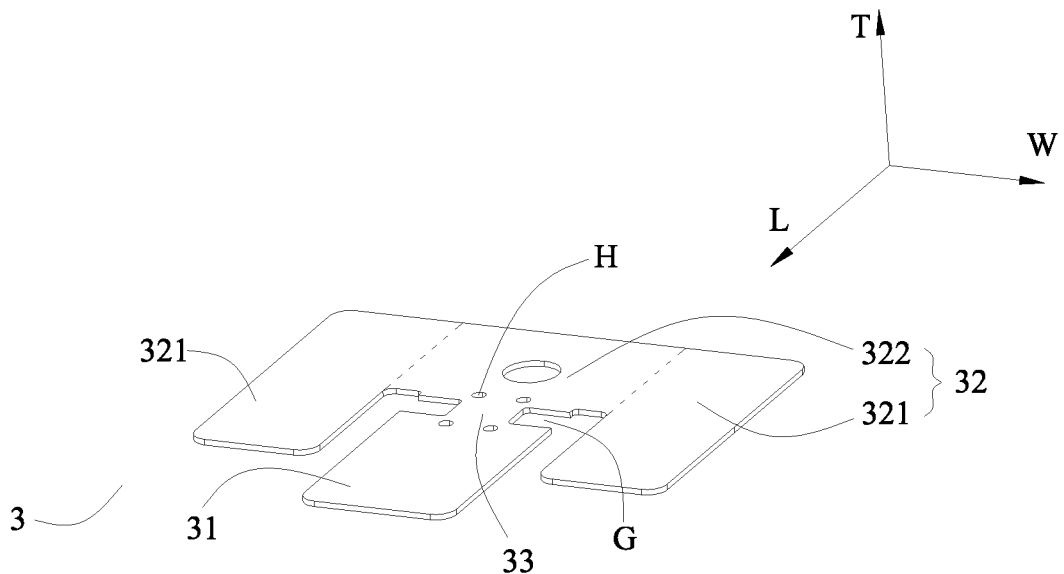
FIG. 11 is a schematic view of the first connecting piece of the secondary battery according to the present disclosure.
Figure 12:
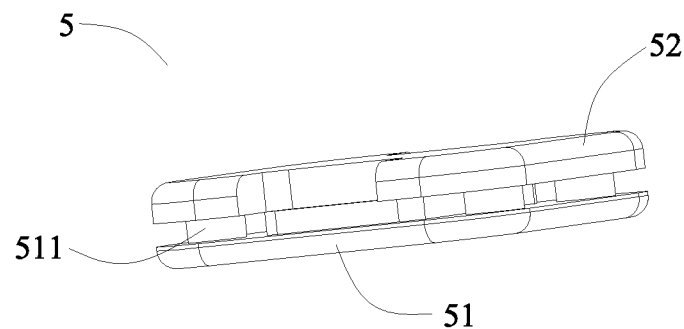
FIG. 12 is a perspective view of the insulating holding block of the secondary battery according to the present disclosure.
Figure 13:
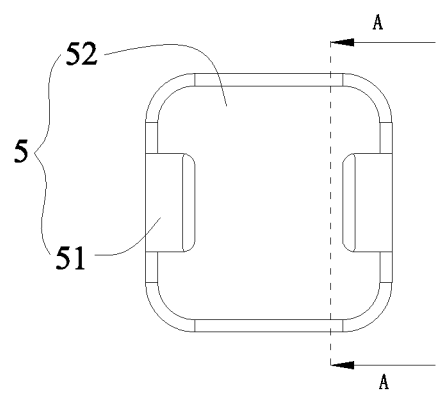
FIG. 13 is a top view of FIG. 12.
Figure 14:
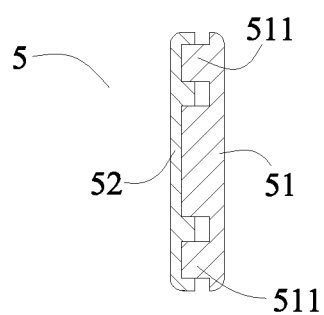
FIG. 14 is a cross sectional view taken along a line A-A of FIG. 13.

In the secondary battery according to the present disclosure, referring to FIGS. 9-11, the fixing hole H is a circular hole, and the fixing hole H of the first electrode terminal connecting portion 31 is provided as at least two in number, the fixing hole H of the first electrode tab connecting portion 32 is provided as at least two in number. A shape of the fixing post 511 corresponds to the shape of the fixing hole H. In an embodiment that the first electrode terminal connecting portion 31 is securely connected with the first electrode tab connecting portion 32 via the cooperation between the first holding portion 51 and the second holding portion 52, if the first electrode tab connecting portion 32 only has one fixing hole H (in other words, only one fixing post 511 passes through the first electrode tab connecting portion 32), when the first fusing portion 33 is fused and the secondary battery is subjected to external impact, the first electrode tab connecting portion 32 will rotate around the fixing post 511, so as to cause the contact between the first electrode tab connecting portion 32 and the first electrode terminal connecting portion 31. Similarly, if the first electrode terminal connecting portion 31 only has one fixing hole H, it will cause the above-mentioned problem too. But in another embodiment that the fixing posts 511 of the first holding portion 5 are securely connected with the first connecting piece 3 directly, the fixing hole H of each of the first electrode terminal connecting portion 31 and the first electrode tab connecting portion 32 may be provided as one in number.

In the secondary battery according to the present disclosure, referring to FIG. 10, the first fusing portion 33 is formed by providing an opening 331 in the first connecting piece 3, and the first fusing portion 33 includes fusing sub-portions 332 provided at two sides of the opening 331 respectively along a width direction W. The first holding portion 51 further includes another fixing post 511 which passes through the opening 331.

In the secondary battery according to the present disclosure, referring to FIG. 11, the first fusing portion 33 is formed by providing notches G in the first connecting piece 3, the notches G are provided at two sides of the first fusing portion 33 respectively along the width direction W.

In the secondary battery according to the present disclosure, an overcurrent sectional area of the first fusing portion 33 is smaller than an overcurrent sectional area of the first electrode terminal connecting portion 31 and an overcurrent sectional area of the first electrode tab connecting portion 32 (due to provision of the opening 331 or the notches G), therefore, when the high current flows through the first connecting piece 3, the first fusing portion 33 will be fused in time so as to quickly cut off the electrical connection between the first electrode tab 21 and the first electrode terminal 11, and prevent thermal runaway of the secondary battery.

In the secondary battery according to the present disclosure, the electrode assembly 2 is provided as multiple in number; correspondingly, referring to FIGS. 9-11, the first electrode tab connecting portion 32 includes two first electrode tab connecting sub-portions 321 and a first electrode tab jointing sub-portion 322. The two first electrode tab connecting sub-portions 321 extend along a length direction L, and each first electrode tab connecting sub-portion 321 is fixed to and electrically connected with the first electrode tab 21 of the corresponding electrode assembly 2. The first electrode tab jointing sub-portion 322 extends along the width direction W, and two ends of the first electrode tab jointing sub-portion 322 are connected with the two first electrode tab connecting sub-portions 321 respectively. The first electrode terminal connecting portion 31 is positioned between the two first electrode tab connecting sub-portions 321 and extends along the length direction L. The first fusing portion 33 extends along the length direction L and is connected between the first electrode tab jointing sub-portion 322 and the first electrode terminal connecting portion 31. The first connecting piece 3 is planar in whole.

In the secondary battery according to the present disclosure, an extending direction and an arranging way of the two first electrode tab connecting sub-portions 321 (the two first electrode tab connecting sub-portions 321 are the same as the first electrode terminal connecting portion 31 in the extending direction, and are positioned at two sides of the first electrode terminal connecting portion 31 respectively along the width direction W) can increase a contact area between the first electrode tab 21 of the electrode assembly 2 and the corresponding first electrode tab connecting sub-portion 321, thereby increasing the overcurrent area.

Figure 4:
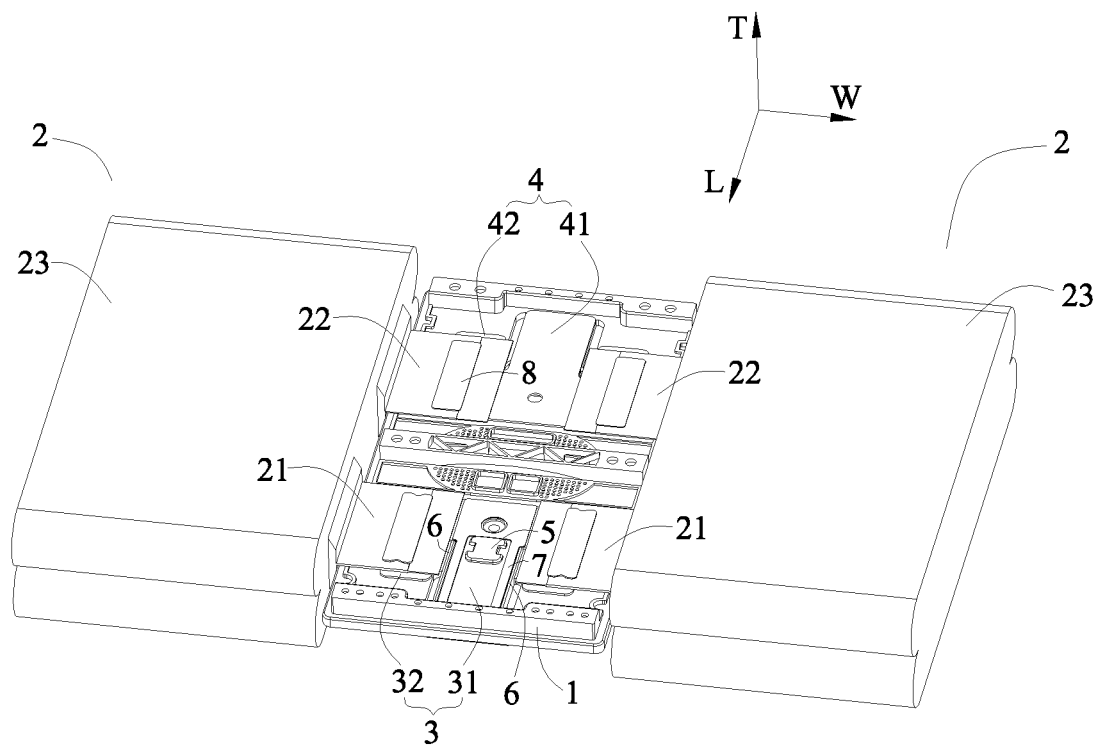
FIG. 4 is a schematic view of a secondary battery according to the present disclosure.
Figure 6:
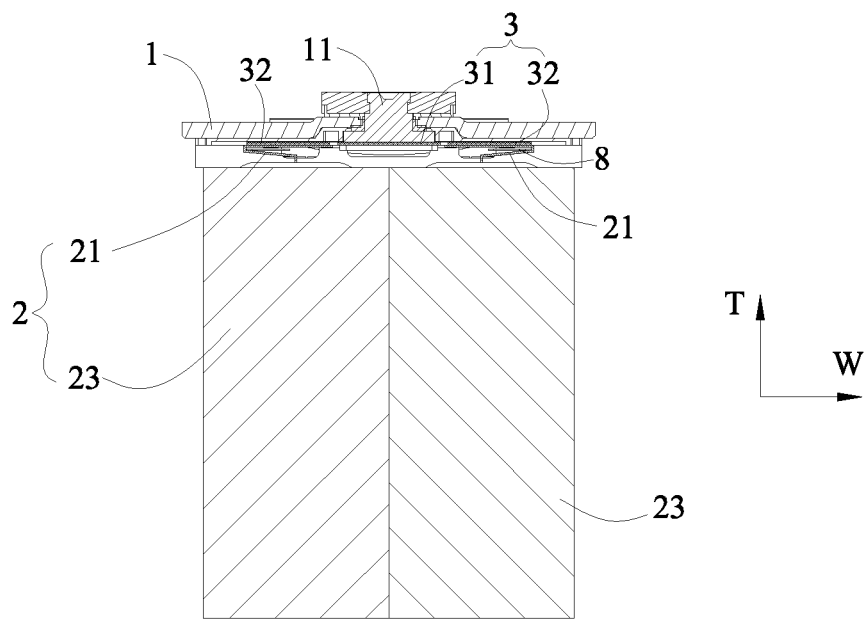
FIG. 6 is a cross sectional view of the secondary battery according to the present disclosure.

In the secondary battery according to the present disclosure, referring to FIG. 4, the secondary battery further comprises two insulating bars 6, each insulating bar 6 is provided in a gap between the first electrode terminal connecting portion 31 and the first electrode tab connecting sub-portion 321, and each insulating bar 6 is not lower than a surface of the first connecting piece 3 which is connected with the first electrode tab 21 along the thickness direction T (in other words, each insulating bar 6 is not lower than a surface of the first electrode terminal connecting portion 31 which faces a main body 23 of the electrode assembly 2 along the thickness direction T). The first electrode tab 21 may extend beyond the gap and extend to the first electrode terminal connecting portion 31 if the first electrode tab 21 is too long, thereby leading to a directly contact between the first electrode tab 21 and the first electrode terminal connecting portion 31, and resulting in a failure of the first fusing portion 33. Because the two insulating bars 6 are respectively provided in the two gaps and each insulating bar 6 is not lower than the surface of the first connecting piece 3 which is connected with the first electrode tab 21 along the thickness direction T, the insulating bars 6 can function for isolation and prevent the first electrode tab 21 from electrically connecting with the first electrode terminal connecting portion 31 (if each insulating bar 6 is flush with the surface of the first connecting piece 3 which is connected with the first electrode tab 21 along the thickness direction T, each insulating bar 6 can avoid the first electrode tab 21 electrically connecting with a side wall of the first electrode terminal connecting portion 31 which is used to form the corresponding gap, and if each insulating bar 6 is higher than the surface of the first connecting piece 3 which is connected with the first electrode tab 21 along the thickness direction T, each insulating bar 6 can further avoid the first electrode tab 21 contacting the surface of the first electrode terminal connecting portion 31 which faces the main body 23 of the electrode assembly 2). In addition, the "not lower than" and the "higher than" are with respect to the thickness direction T as shown in FIG. 4, in other words, each insulating bar 6 is flush with the first connecting piece 3 or is protruding from the first connecting piece 3 along a direction toward the electrode assembly 2 after the secondary battery is formed as a finished product as shown in FIG. 6.

In the secondary battery according to the present disclosure, referring to FIG. 4, FIG. 9 and FIG. 10, the secondary battery further comprises an insulating piece 7 adhered on a surface of the first connecting piece 3 which faces the electrode assembly 2 (specifically the main body 23 of the electrode assembly 2), and the insulating piece 7 at least covers two edges of the first electrode terminal connecting portion 31 which are respectively positioned at two sides of the first electrode terminal connecting portion 31 along the width direction W. The first electrode tab 21 may extend beyond the gap and extend to the corresponding edge of the first electrode terminal connecting portion 31 along the width direction W if the first electrode tab 21 is too long, thereby leading to the direct contact between the first electrode tab 21 and the first electrode terminal connecting portion 31, and resulting in the failure of the first fusing portion 33; but the insulating piece 7 at least covers the two edges of the first electrode terminal connecting portion 31 which are respectively positioned at the two sides of the first electrode terminal connecting portion 31 along the width direction W, so the insulating piece 7 can isolate the first electrode tab 21 from the first electrode terminal connecting portion 31, and prevent the first electrode tab 21 from electrically connecting with the first electrode terminal connecting portion 31.

Figure 7:
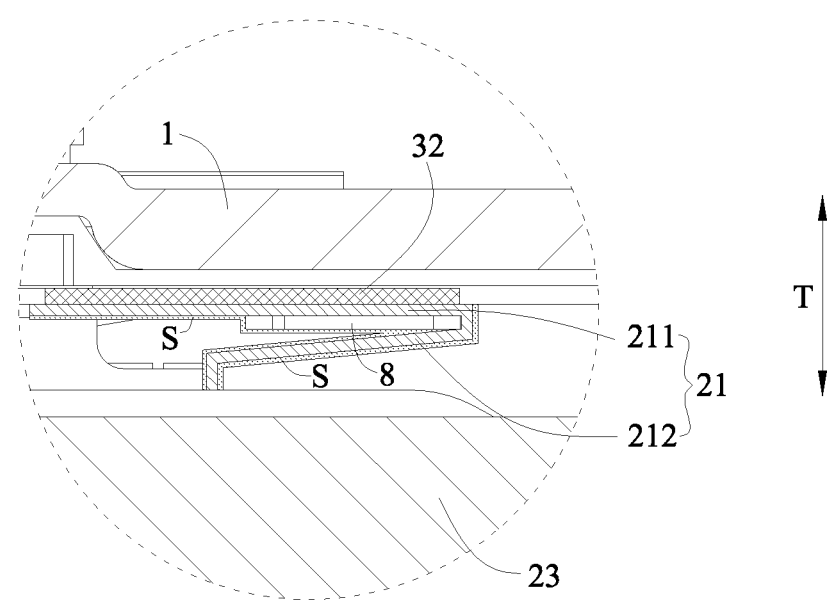
FIG. 7 is a schematic view of a first electrode tab of the secondary battery according to the present disclosure.
Figure 8:
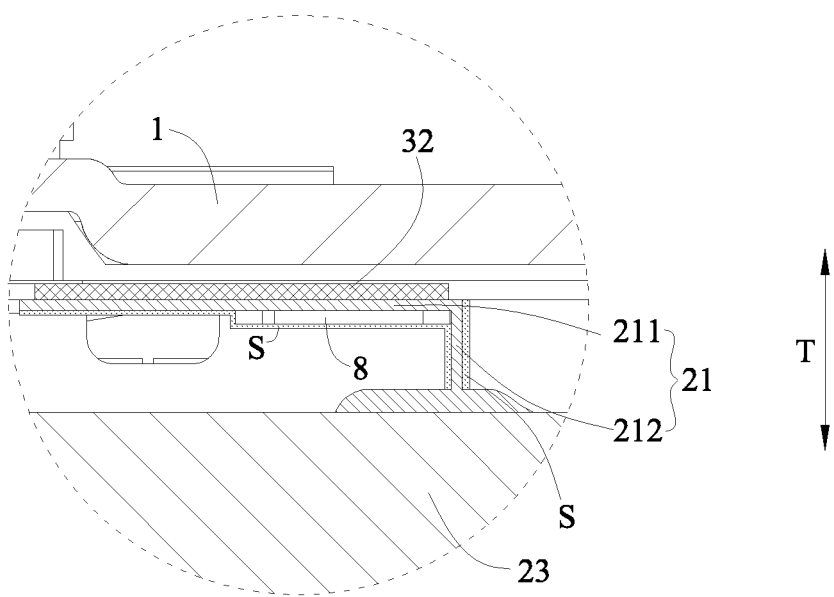
FIG. 8 is another schematic view of the first electrode tab of the secondary battery according to the present disclosure.

In the secondary battery according to the present disclosure, referring to FIG. 7 and FIG. 8, the first electrode tab 21 includes a connecting section 211 and a bending section 212. An outer side of the connecting section 211 is securely connected with the first electrode tab connecting portion 32; the bending section 212 bends and is connected between the main body 23 of the electrode assembly 2 and the connecting section 211, and an angle between the connecting section 211 and the bending section 212 is less than 120 degrees.

In the secondary battery according to the present disclosure, referring to FIG. 8, the angle between the connecting section 211 and the bending section 212 ranges from 85 degrees to 95 degrees. At this time, the bending section 212 extends nearly along the thickness direction T, so as to prevent short circuit caused by the bending section 212 when the bending section 212 is pressed down.

In the secondary battery according to the present disclosure, referring to FIG. 7, the angle between the connecting section 211 and the bending section 212 ranges from 0 degrees to 45 degrees. At this time, the bending section 212 nearly folds back onto the connecting section 211, thereby effectively reducing the space occupied by the first electrode tab 21, and promoting a utilization rate of the space inside the secondary battery.

In the secondary battery according to the present disclosure, referring to FIG. 7 and FIG. 8, the secondary battery further comprises an insulating adhesive S, the insulating adhesive S at least is adhered on an inside portion of the connecting section 211 which directly faces the main body 23 of the electrode assembly 2. When the cap plate 1 is assembled to a case (not shown)receiving the electrode assembly 2, the cap plate 1 will press down the first electrode tab 21 to easily result in that the connecting section 211 (especially the portion of the connecting section 211 which directly faces the main body 23 of the electrode assembly 2) of the first electrode tab 21 will directly contact the main body 23 (especially an electrode plate of the main body 23 which is opposite to the first electrode tab 21 in electrical polarity) of the electrode assembly 2, thereby resulting in short circuit; but it can avoid the short circuit of the electrode assembly 2 and improve the safety performance of the secondary battery by provision of the insulating adhesive S.

In the secondary battery according to the present disclosure, referring to FIG. 7 and FIG. 8, preferably, each of the inside portion of the connecting section 211 and an inside portion of the bending section 212 is covered by the insulating adhesive S.

In the secondary battery according to the present disclosure, referring to FIG. 7 and FIG. 8, the secondary battery further comprises an insulating adhesive S adhered on an outside portion of the bending section 212. When the cap plate 1 is assembled to the case (not shown) receiving the electrode assembly 2, the first electrode tab 21 will be pressed down and bent, and the outside portion of the bending section 212 will easily contact the case, thereby resulting in short circuit; but it can avoid the short circuit of the electrode assembly 2 and improve the safety performance of the secondary battery by provision of the insulating adhesive S which covers the outside portion of the bending section 212.

In the secondary battery according to the present disclosure, referring to FIGS. 4-8, the secondary battery further comprises a welding protecting piece 8 provided on the first electrode tab 21; the welding protecting piece 8, the connecting section 211 of the first electrode tab 21 and the first electrode tab connecting portion 32 are securely connected together by ultrasonic welding. The welding protecting piece 8 can improve connection strength between the connecting section 211 of the first electrode tab 21 and the first electrode tab connecting portion 32. An insulating adhesive tape is adhered on weld zones formed during the ultrasonic welding. Metal chips generated during the welding can be fixed to the insulating adhesive tape, so the insulating adhesive tape can prevent the metal chips from entering into the inside of the electrode assembly 2, also function for insulation and avoid the internal short circuit of the electrode assembly 2.

Figure 5:
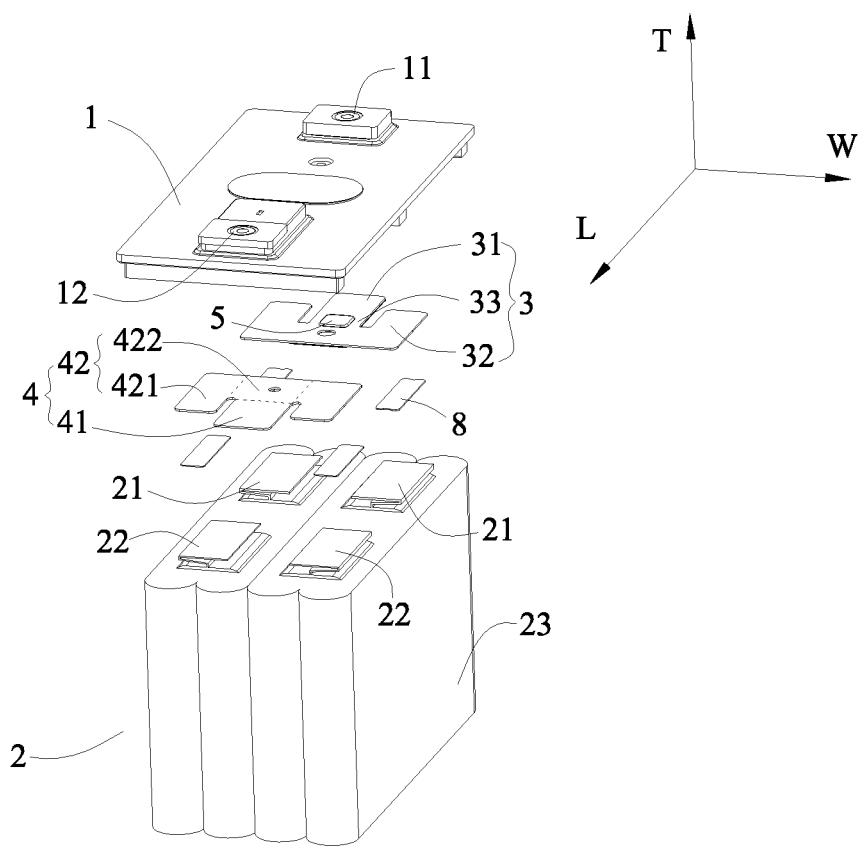
FIG. 5 is an exploded view of the secondary battery according to the present disclosure.

In the secondary battery according to the present disclosure, referring to FIG. 4 and FIG. 5, the secondary battery further comprises: a second connecting piece 4 connected in series between the second electrode tab 22 and the second electrode terminal 12.

In the secondary battery according to the present disclosure, referring to FIG. 4 and FIG. 5, the second connecting piece 4 includes: a second electrode terminal connecting portion 41 fixed to and electrically connected with the second electrode terminal 12; and a second electrode tab connecting portion 42 fixed to and electrically connected with the second electrode tab 22 of the electrode assembly 2.

In the secondary battery according to the present disclosure, referring to FIG. 4 and FIG. 5, the electrode assembly 2 is provided as multiple in number; correspondingly, the second electrode tab connecting portion 42 includes two second electrode tab connecting sub-portions 421 and a second electrode tab jointing sub-portion 422. The two second electrode tab connecting sub-portions 421 extend along the length direction L, and each second electrode tab connecting sub-portion 421 is fixed to and electrically connected with the second electrode tab 22 of the corresponding electrode assembly 2. The second electrode tab jointing sub-portion 422 extends along the width direction W, and two ends of the second electrode tab jointing sub-portion 422 are connected with the two second electrode tab connecting sub-portions 421 respectively. The second electrode terminal connecting portion 41 is positioned between the two second electrode tab connecting sub-portions 421 and extends to the second electrode tab jointing sub-portion 422 along the length direction L.

In the secondary battery according to the present disclosure, an extending direction and an arranging way of the two second electrode tab connecting sub-portions 421 (the two second electrode tab connecting sub-portions 421 are the same as the second electrode terminal connecting portion 41 in the extending direction, and are positioned at two sides of the second electrode terminal connecting portion 41 respectively along the width direction W) can increase a contact area between the second electrode tab 22 of the electrode assembly 2 and the corresponding second electrode tab connecting sub-portion 421, thereby increasing the overcurrent area.

In the secondary battery according to the present disclosure, the secondary battery further comprises: a welding protecting piece 8 provided on the second electrode tab 22; the welding protecting piece 8, the second electrode tab 22 and second electrode tab connecting sub-portion 421 are securely connected together by ultrasonic welding. An insulating adhesive tape is adhered on weld zones formed by the ultrasonic welding. Metal chips generated during the welding can be fixed to the insulating adhesive tape, so the insulating adhesive tape can prevent the metal chips from entering into the inside of the electrode assembly 2, also function for insulation and avoid the internal short circuit of the electrode assembly 2.

In the secondary battery according to the present disclosure, the first electrode terminal connecting portion 31 and the first electrode terminal 11 are securely connected by laser welding, the second electrode terminal connecting portion 41 and the second electrode terminal 12 are securely connected together by laser welding. An insulating adhesive tape is adhered on weld zones formed during the laser welding. Metal chips generated during the welding can be fixed to the insulating adhesive tape, so the insulating adhesive tapes can prevent the metal chips from entering into the inside of the electrode assembly 2, also function for insulation and avoid the internal short circuit of the electrode assembly 2.

What is claimed is:

1. A secondary battery, comprising:
a cap plate provided with a first electrode terminal and a second electrode terminal;
an electrode assembly comprising a first electrode tab and a second electrode tab;
a first connecting piece connected between the first electrode tab and the first electrode terminal;
the second electrode tab being electrically connected with the second electrode terminal; wherein
the first connecting piece includes a first electrode terminal connecting portion, a first electrode tab connecting portion and a first fusing portion, the first electrode terminal connecting portion is fixed to the first electrode terminal, the first electrode tab connecting portion is fixed to the first electrode tab, and the first fusing portion is connected between the first electrode terminal connecting portion and the first electrode tab connecting portion;
the secondary battery further comprises an insulating holding block, two ends of the insulating holding block are connected with the first electrode terminal connecting portion and the first electrode tab connecting portion respectively, and the insulating holding block is configured to maintain the first electrode terminal connecting portion and the first electrode tab connecting portion in position relative to each other when the first fusing portion is fused;
the first electrode tab connecting portion is provided with a through fixing hole;
the insulating holding block comprises a first holding portion;
the first holding portion is provided on one side of the first connecting piece along a thickness direction and includes a first fixing post which corresponds to and passes through the fixing hole of the first electrode tab connecting portion.

2. The secondary battery according to claim 1, wherein
the first electrode terminal connecting portion is also provided with a through fixing hole;
the insulating holding block further comprises a second holding portion;
the first holding portion includes a second fixing post which corresponds to and passes through the fixing hole of the first electrode terminal connecting portion;
each of the first and second fixing posts extends to the other side of the first connecting piece along the thickness direction;
the second holding portion is provided on the other side of the first connecting piece along the thickness direction and is connected with the first and second fixing posts of the first holding portion which respectively pass through the fixing hole of the first electrode terminal connecting portion and the fixing hole of the first electrode tab connecting portion.

3. The secondary battery according to claim 1, wherein the first electrode terminal connecting portion is also provided with a through fixing hole;
the first holding portion includes a second fixing post which corresponds to and passes through the fixing hole of the first electrode terminal connecting portion;
each of the first and second fixing posts is connected with the first connecting piece.

4. The secondary battery according to claim 2, wherein the fixing hole is an oblong hole; or
the fixing hole is a circular hole, and the fixing hole of the first electrode terminal connecting portion is provided as at least two in number, the fixing hole of the first electrode tab connecting portion is provided as at least two in number.

5. The secondary battery according to claim 3, wherein the fixing hole is an oblong hole; or
the fixing hole is a circular hole, and the fixing hole of the first electrode terminal connecting portion is provided as at least two in number, the fixing hole of the first electrode tab connecting portion is provided as at least two in number.

6. The secondary battery according to claim 1, wherein the first fusing portion is formed by providing an opening in the first connecting piece, and the first fusing portion includes fusing sub-portions provided at two sides of the opening respectively along a width direction; or
the first fusing portion is formed by providing notches in the first connecting piece, the notches are provided at two sides of the first fusing portion respectively along the width direction.

7. The secondary battery according to claim 1, wherein the electrode assembly is provided as multiple in number;
the first electrode tab connecting portion includes two first electrode tab connecting sub-portions and a first electrode tab jointing sub-portion;
the two first electrode tab connecting sub-portions extend along a length direction, and each first electrode tab connecting sub-portion is fixed to the first electrode tab of the corresponding electrode assembly;
the first electrode tab jointing sub-portion extends along a width direction, and two ends of the first electrode tab jointing sub-portion are connected with the two first electrode tab connecting sub-portions respectively;
the first electrode terminal connecting portion is positioned between the two first electrode tab connecting sub-portions and extends along the length direction;
the first fusing portion extends along the length direction and is connected between the first electrode tab jointing sub-portion and the first electrode terminal connecting portion.

8. The secondary battery according to claim 7, wherein the secondary battery further comprises two insulating bars, each insulating bar is provided in a gap between the first electrode terminal connecting portion and the first electrode tab connecting sub-portion, and each insulating bar is not lower than a surface of the first connecting piece which is connected with the first electrode tab along a thickness direction.

9. The secondary battery according to claim 7, wherein the secondary battery further comprises an insulating piece adhered on a surface of the first connecting piece which faces the electrode assembly, and the insulating piece covers two edges of the first electrode terminal connecting portion along the width direction.

10. The secondary battery according to claim 1, wherein the first electrode tab includes a connecting section and a bending section;
an outer side of the connecting section is connected with the first electrode tab connecting portion;
the bending section bends and is connected between a main body of the electrode assembly and the connecting section, and an angle between the connecting section and the bending section is less than 120 degrees.

11. The secondary battery according to claim 10, wherein the angle between the connecting section and the bending section ranges from 85 degrees to 95 degrees; or
the angle between the connecting section and the bending section ranges from 0 degrees to 45 degrees.

12. The secondary battery according to claim 10, wherein the secondary battery further comprises an insulating adhesive adhered on an inside portion of the connecting section which faces the main body of the electrode assembly; and/or
the secondary battery further comprises an insulating adhesive adhered on an outside portion of the bending section.

13. The secondary battery according to claim 10, wherein the secondary battery further comprises: a welding protecting piece provided on the first electrode tab;
the welding protecting piece, the connecting section of the first electrode tab and the first electrode tab connecting portion are connected together by ultrasonic welding.

14. An assembly for secondary battery, wherein the assembly for secondary battery comprises a first connecting piece and an insulating holding block;
the first connecting piece includes a first electrode terminal connecting portion, a first electrode tab connecting portion and a first fusing portion, the first fusing portion is connected between the first electrode terminal connecting portion and the first electrode tab connecting portion;
two ends of the insulating holding block are connected with the first electrode terminal connecting portion and the first electrode tab connecting portion respectively, and the insulating holding block is configured to maintain the first electrode terminal connecting portion and the first electrode tab connecting portion in position relative to each other when the first fusing portion is fused;
the first electrode tab connecting portion is provided with a through fixing hole;
the insulating holding block comprises a first holding portion;
the first holding portion is provided on one side of the first connecting piece along a thickness direction and includes a first fixing post which corresponds to and passes through the fixing hole of the first electrode tab connecting portion.

15. The assembly for secondary battery according to claim 14, wherein
the first electrode terminal connecting portion is also provided with a through fixing hole;
the insulating holding block further comprises a second holding portion;
the first holding portion includes a second fixing post which corresponds to and passes through the fixing hole of the first electrode terminal connecting portion;
each of the first and second fixing posts extends to the other side of the first connecting piece along the thickness direction;
the second holding portion is provided on the other side of the first connecting piece along the thickness direction and is connected with the first and second fixing posts of the first holding portion which respectively pass through the fixing hole of the first electrode terminal connecting portion and the fixing hole of the first electrode tab connecting portion.

16. The assembly for secondary battery according to claim 14, wherein
the first electrode terminal connecting portion is also provided with a through fixing hole;

the first holding portion includes a second fixing posts which corresponds to and passes through the fixing hole of the first electrode terminal connecting portion;

each of the first and second fixing posts is connected with the first connecting piece.

17. The assembly for secondary battery according to claim 15, wherein the fixing hole is an oblong hole; or the fixing hole is a circular hole, and the fixing hole of the first electrode terminal connecting portion is provided as at least two in number, the fixing hole of the first electrode tab connecting portion is provided as at least two in number.

18. The assembly for secondary battery according to claim 14, wherein the first fusing portion is formed by providing an opening in the first connecting piece, and the first fusing portion includes fusing sub-portions provided at two sides of the opening respectively along a width direction; or the first fusing portion is formed by providing notches in the first connecting piece, the notches are provided at two sides of the first fusing portion respectively along the width direction.

19. The assembly for secondary battery according to claim 14, wherein the first electrode tab connecting portion includes two first electrode tab connecting sub-portions and a first electrode tab jointing sub-portion;

the two first electrode tab connecting sub-portions extend along a length direction;

the first electrode tab jointing sub-portion extends along a width direction, and two ends of the first electrode tab jointing sub-portion are connected with the two first electrode tab connecting sub-portions respectively;

the first electrode terminal connecting portion is positioned between the two first electrode tab connecting sub-portions and extends along the length direction;

the first fusing portion extends along the length direction and is connected between the first electrode tab jointing sub-portion and the first electrode terminal connecting portion.

20. The assembly for secondary battery according to claim 19, wherein the assembly for secondary battery further comprises an insulating piece adhered on a surface of the first connecting piece which faces the electrode assembly, and the insulating piece covers two edges of the first electrode terminal connecting portion along the width direction.

* * * * *